United States Patent
Dyson

[15] 3,683,015
[45] Aug. 8, 1972

[54] RESOLUTION OF 2-(6-METHOXY-2-NAPHTHYL)PROPIONIC

[72] Inventor: Norman H. Dyson, 3401 Hillview Ave., Palo Alto, Calif. 94304

[22] Filed: Nov. 4, 1970

[21] Appl. No.: 86,976

[52] U.S. Cl. ................................. 260/520, 260/284
[51] Int. Cl. ............................................. C07c 69/76
[58] Field of Search .............. 260/520, 534 C, 534 G

[56] References Cited

OTHER PUBLICATIONS

Gilman, Ed., Organic Chemistry, Wiley & Sons Inc. (1958) p. 256

*Primary Examiner*—Lorraine A. Weinberger
*Assistant Examiner*—John F. Terapane
*Attorney*—Evelyn K. Merker, Gerard A. Blaufarb and William B. Walker

[57] ABSTRACT

Resolution of 2-(6-methoxy-2-naphthyl)propionic acid with cinchonidine to yield the d-isomer is greatly improved by using, in combination with the cinchonidine, an optically inactive amine having a basicity, pKa, greater than 8 and less than 12 and having a solubility as the salt of 2-(6-methoxy-2-naphthyl)propionic acid greater than the solubility of the corresponding cinchonidine salt. The product has anti-inflammatory, anti-pyretic and analgesic activities.

5 Claims, No Drawings

RESOLUTION OF 2-(6-METHOXY-2-NAPHTHYL)PROPIONIC

This invention relates to an improved method for resolving mixtures of d and l 2-(6-methoxy-2-naphthyl)propionic acid to yield mixtures containing a higher proportion of the d-isomer.

Prior to this invention, 2-(6-methoxy-2-naphthyl)propionic acid had been resolved with cinchonidine by a procedure requiring multiple crystallizations in a lower alcohol such as methanol. Because of the time and expense required for this tedious procedure, process improvements in both quality and quantity were desired. It is the object of this invention to provide an improved process for resolving mixtures of d and l 2-(6-methoxy-2-naphthyl)propionic acid to yield mixtures containing higher proportion of the d-isomer, which process in a single crystallization step provides improved quality (greater enrichment) and higher yield.

In summary, the process of this invention for resolving mixtures of d and l 2-(6-methoxy-2-naphthyl)propionic acid comprises the steps of a. preparing a mixture of cinchonidine, a mixture of d and l 2-(6-methoxy-2-naphthyl)propionic acid, an insert organic solvent in which the cinchonidine salts of d and l 2-(6-methoxy-2-naphthyl)propionic acid are soluble, and an optically inactive amine having a basicity, pKa, greater than 8 and less than 12, the solubility in the inert organic solvent of the d and l 2-(6-methoxy-2-naphthyl)propionic acid salts with said optically inactive amine being greater than the solubility of the cinchonidine salts of d and l 2-(6-methoxy-2-naphthyl)propionic acid; and b. crystallizing the cinchonidine salts of 2-(6-methoxy-2-naphthyl)propionic acid from the mixture to yield a salt mixture enriched in the salt of d 2-(6-methoxy-2-naphthyl)propionic acid.

This procedure can be followed by one or more recrystallizations to increase the purity of the d-isomer. Finally, the salt is cleaved to yield the d 2-(6-methoxy-2-naphthyl)propionic acid.

The 2-(6-methoxy-2-naphthyl)propionic acid and methods for its preparation are described in U.S. application Ser. No. 694,771 filed Dec. 7, 1967 and Ser. No. 741,858 filed July 2, 1968, as briefly described hereinafter. One such method involves the reaction of a 1-halo-2-methoxynaphthalene with acetyl chloride in nitrobenzene in the presence of 3 molar equivalents of aluminum chloride to yield the corresponding 5-halo-6-methoxy-2-acetylnaphthalene derivative. The resulting derivative is heated with morpholine in the presence of sulfur at 150° C, and the resulting product is refluxed with concentrated hydrochloric acid to furnish the corresponding 2-naphthylacetic acid derivative. The latter compound is then esterified such as by reacting it with an alkanol in the presence of boron trifluoride, and the ester is treated with an alkali metal hydride in an ether solvent and then with an alkyl halide such as methyl iodide to yield the corresponding 2-(6-methoxy-2-naphthyl)propionate. The latter is hydrolyzed, for example in an aqueous basic solution, to yield the corresponding 2-(6-methoxy-2-naphthyl)-propionic acid.

The optically inactive amines used in the process of this invention have a basicity of pKa, greater than 8 and less than 12, preferably from 9 to 11, and optimally from 9.5 to 10.5. The solubility in the inert organic solvent of the optically inactive amine salts of d and l 2-(6-methoxy-2-naphthyl)propionic acid must be greater than the solubility of the corresponding cinchonidine salts of d and l 2-(6-methoxy-2-naphthyl)propionic acid. Either primary, secondary or tertiary amines can be used as the optically inactive amine, but tertiary amines are preferred because they present no problem of amide formation. The particular choice of optically inactive amine will depend upon the particular inert organic solvent system used for the crystallization. The suitability of any particular optically inactive amine in the process can be routinely determined by applying the above criterion. Examples of optically inactive amines having basicity within the desired range include diethylamine, cyclohexylamine, ethylamine, methylamine, triethylamine, O-alkylureas, piperizine, trimethylamine, allylamine, ethanolamine, benzylamine, diallylamine, 4-aminopyridine, and the like.

The inert organic solvent system for the process of this invention can use any inert organic solvent in which the cinchonidine salt of 2-(6-methoxy-2-naphthyl)propionic acid is soluble. Examples of such solvents include acetone, acetylacetone, adiponitrile, 2-amino-2-methyl-1-propanol, benzonitrile, benzothiozole, benzyl alcohol, benzyl mercaptan, butyl alcohol, capryl alcohol, diacetone alcohol, diethanolamine, mono- and di(lower)alkyl ethers of ethylene glycol and diethylene glycol, di-N-propylaniline, ethanol, methanol, n-propanol, i-propanol, ethyl isothiocyanate, methyl isothiocyanate, ethylene glycol, 1,2-propylene glycol, 1,3-propylene glycol, 2-ethylhexanol, dimethyl-sulfoxide, sulfolanes, dimethylformamide, N-methylpyrollidine, formamide, furfuryl alcohol, glycerol, hydroxyethylethylenediamine, isoamyl alcohol, isoamyl sulfide, isobutyl mercaptan, methyl disulfide, dibutoxytetraethylene glycol, pyridine, trimethylene glycol, dioxane, dimethylacetamide, and the like. The preferred solvents are polar.

The solution should preferably contain about equal molar amounts of the 2-(6-methoxy-2-naphthyl)propionic acid and amines, including both cinchonidine and the optically inactive amine. The ratio of cinchonidine to optically inactive amine is not critical for resolution to occur. Cinchonidine to optically inactive amine molar ratios of 2:3–3:2 are operable, for example. For optimum quality and quantity yields of d 2-(6-methoxy-2-naphthyl)propionic acid, the molar ratio of cinchonidine and optically inactive amine should be about 1:1. At lower cinchonidine to optically inactive amine molar ratios, the quality of the product is not impaired but the quantity or yield rapidly decreases. With higher cinchonidine to optically inactive amine molar ratios, the quantity or yield is satisfactory, but the quality is impaired.

In general, resolution by crystallization is achieved by cooling a nearly saturated solution of the mixture of d and l 2-(6-methoxy-2-naphthyl)propionic acid salt of the amines (cinchonidine and optically active amine) to a temperature at which the solution becomes supersaturated with the salts. Continued cooling causes continued crystallization of the dissolved salts. Preferably, the solution is seeded with small quantities of the cinchonidine salt of d 2-(6-methoxy-2-naphthyl)-propionic acid during the cooling since this insures good resolution and high yields of the desired d acid salt. The initial and final temperatures of the solvent are chosen primarily by practical considerations as long as the temperature will not significantly degrade the other components. For example, the nearly saturated solution can have an initial temperature of from 50° to 100° C and can be cooled to a final temperature lower than the initial temperature, e.g., less than 40° C, the temperature difference being sufficient to provide a high yield of crystals. The crystallizing mixture is maintained at the lower temperatures until crystallization is complete or nearly so, usually for longer than 15 minutes and preferably over 0.5 hours. The crystals are separated from the resultant mixture, for example, by filtration.

The quality or percentage of the d-isomer in the product can be increased, if desired, by recrystallization of the above-obtained crystals using the same solvents used in the initial crystallization or with different solvents as found desirable, the recrystallization being generally carried out as described above.

The combined mother liquors from each of the crystallization steps can be reprocessed. Either one or several recrystallizations can be carried out, depending upon the product purity required.

The salt product is cleaved with any organic or inorganic acid not destructive to the product to yield the d-isomer enriched 2-(6-methoxy-2-naphthyl)propionic acid.

This invention is further illustrated by the following specific but non-limiting examples.

EXAMPLE 1

A solution was prepared by adding, to a 5 liter flask, 0.30 kg. of d 1 2-(6-methoxy-2-naphthyl)propionic acid, 0.207 kg. of cinchonidine, 0.098 l. triethylamine and 3.84 l. of methanol. These ingredients were stirred, and the mixture is refluxed until all of the solid dissolves. The mixture is then distilled at atmospheric pressure to a volume of about 3.2 liters and seeded with finely divided cinchonidine salt of d 2-(6-methoxy-2-naphthyl)propionic acid. The distillation is continued to a volume of 2.4 liters. The resulting suspension is refluxed for 2 hours, then cooled to about 55° C and maintained at this temperature for a further one-half hour. The mixture is then cooled to 20° C and maintained for a further hour at this temperature. The resultant suspension is then filtered, and the solids are washed with precooled methanol and dried at 45° C.

EXAMPLE 2

A 0.246 kg. portion of the product of Example 1 is mixed with liters 1.61 liters of ethyl acetate and 1.1 liters of dilute hydrochloric acid (5:1 v/v water to acid). The ethyl acetate layer is then filtered, and the ethyl acetate is replaced with isopropanol by distilling while adding incremental amounts of isopropanol. The product is then mixed with water, cooled to 20° C, filtered, and the residue is washed with water to yield 0.106 kg. of 2-(6-methoxy-2-naphthyl)propionic acid greatly enriched in the d-isomer.

EXAMPLE 3

The percentage of the d-isomer in the product of Example 1 can be increased as follows: a 0.332 kg. portion of the product of Example 1 3.87 liters of methanol and 0.43 liters of pyridine is mixed and refluxed until all the solid dissolves. The mixture is then distilled at atmospheric pressure to a volume of 3.4 liters and seeded with the finely divided cinchonidine salt of d 2-(6-methoxy-2-naphthyl)propionic acid. Distillation is continued until a volume of 2.80 liters is reached. The mixture is then refluxed for 0.5 hour, cooled to 60°–62° C, and maintained at this temperature for a further 0.5 hour. The mixture is then cooled to 20° C and maintained for a further 1 hour at this temperature. The mixture is then filtered, and the solid is washed with precooled methanol to yield a cinchonidine salt of 2-(6-methoxy-2-naphthyl)propionic acid which is greatly enriched in the d-isomer salt.

Repeating the above procedure for a second recrystallization and then cleaving the resultant salt by the procedure of Example 2 yields 2-(6-methoxy-2-naphthyl)propionic acid which is 33 weight percent of the original racemic 2-(6-methoxy-2-naphthyl)propionic acid used in Example 1. The product was greater than 98 percent optically pure, i.e., 99 weight percent d-isomer.

EXAMPLE 4

Repeating the procedure of Example 1 but replacing triethylamine with ethanolamine, trimethylamine, methylamine, and cyclohexylamine yields, in each case, an improved yield of d 2-(6-methoxy-2-naphthyl)propionic acid compared with that obtainable using 100 percent cinchonidine.

I claim:

1. A process for resolving 2-(6-methoxy-2-naphthyl)propionic acid comprising the steps of:
   a. preparing a mixture of cinchonidine, d and l 2-(6-methoxy-2-naphthyl)propionic acid, an inert organic solvent in which the cinchonidine salts of d and l 2-(6-methoxy-2-naphthyl)propionic acid are soluble, and an optically inactive amine having a basicity, pKa, greater than 8 and less than 12, the solubility in the inert organic solvent of the d and l 2-(6-methoxy-2-naphthyl)propionic acid salts of the optically inactive amine being greater than the solubility of the cinchonidine salts of the d and l 2-(6-methoxy-2-naphthyl)propionic acid,
   b. crystallizing the cinchonidine salts of d and l 2-(6-methoxy-2-naphthyl)propionic acid from the mixture to yield a salt enriched in the d 2-(6-methoxy-2-naphthyl)- propionic acid salt.

2. The process of claim 1 wherein the enriched cinchonidine salt is cleaved to yield 2-(6-methoxy-2-naphthyl)propionic acid enriched in the d-isomer.

3. The process of claim 1 wherein the enriched cinchonidine salt is subjected to at least one further crystallization to increase the percentage of d-isomer in the product.

4. The process of claim 1 wherein the molar ratio of cinchonidine to optically inactive amine is from 2:3 to 3:2.

5. The process of claim 4 wherein the optically inactive amine is triethylamine and the solvent is methanol.

* * * * *